April 12, 1927.  1,624,189
J. C. STEEN
SCREW DRIVING MACHINE
Filed April 18, 1922   9 Sheets-Sheet 1
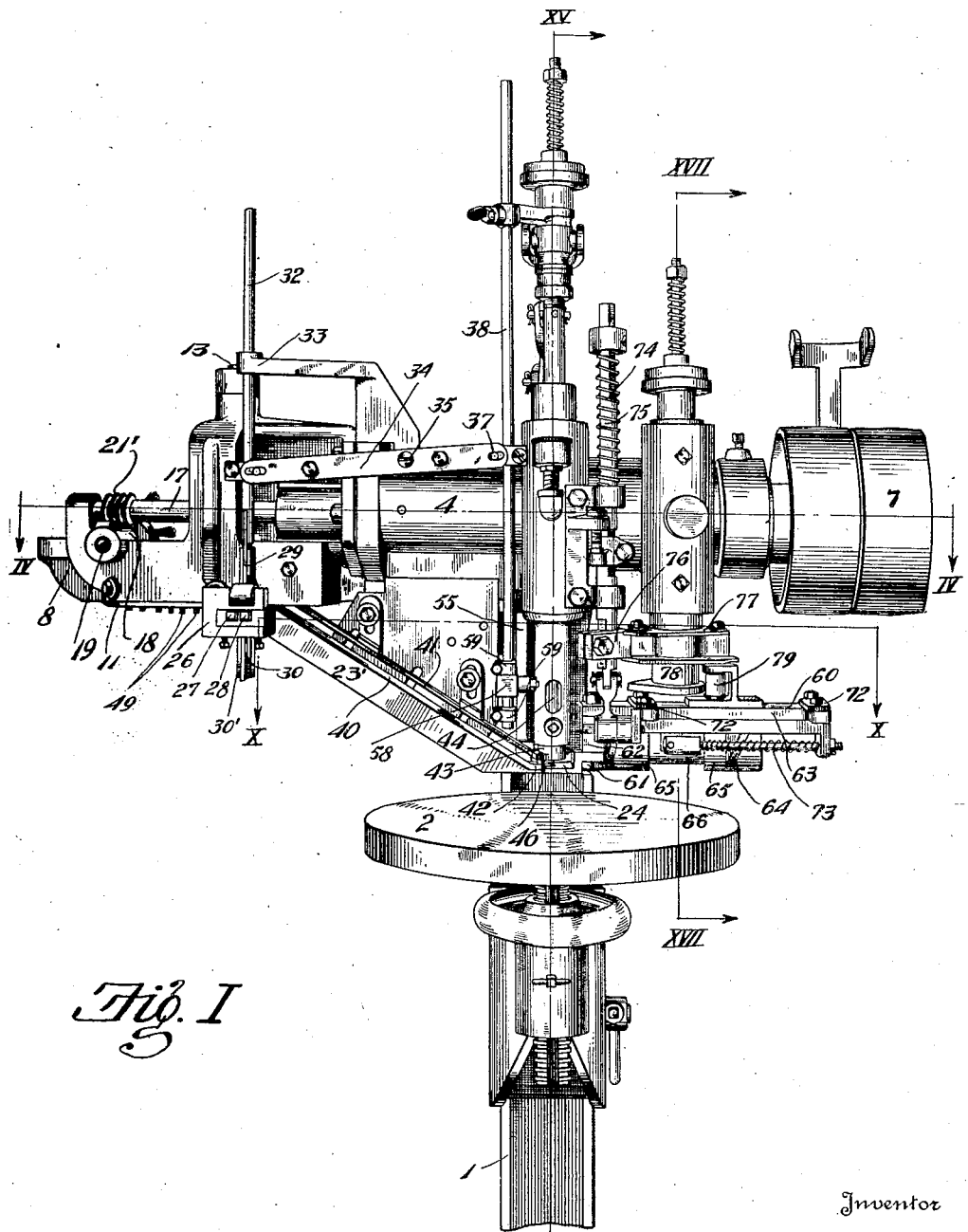
Fig. I
Inventor
James C. Steen
By Frease and Bond
Attorneys

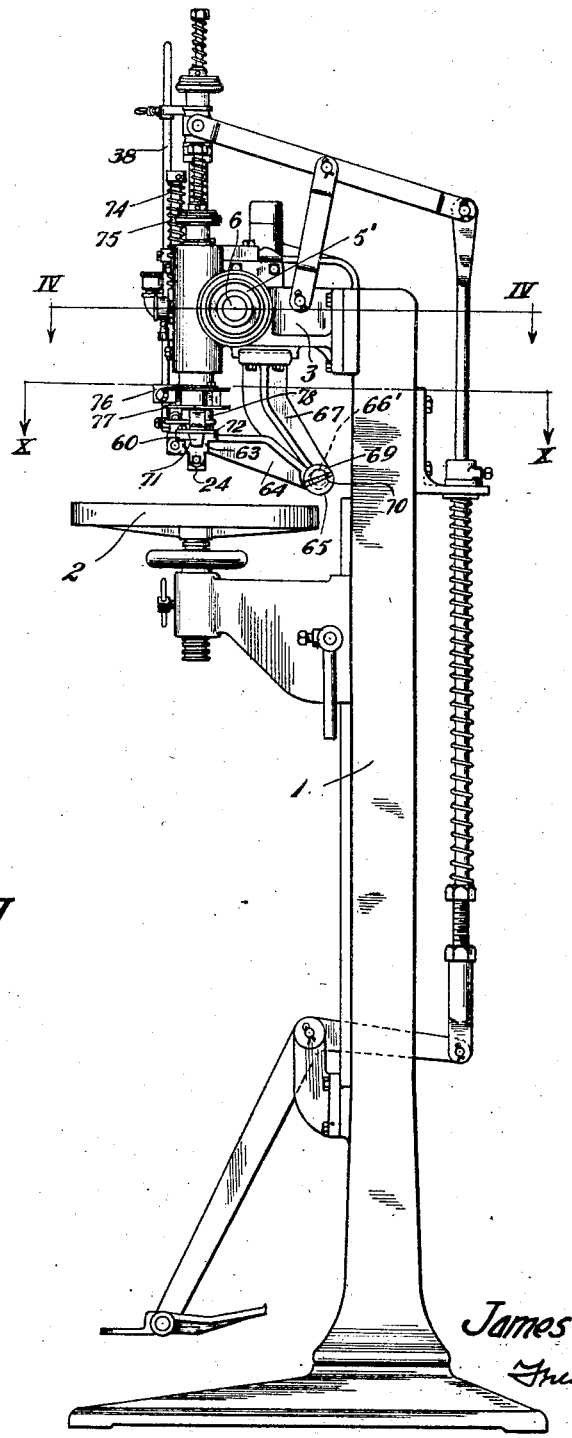

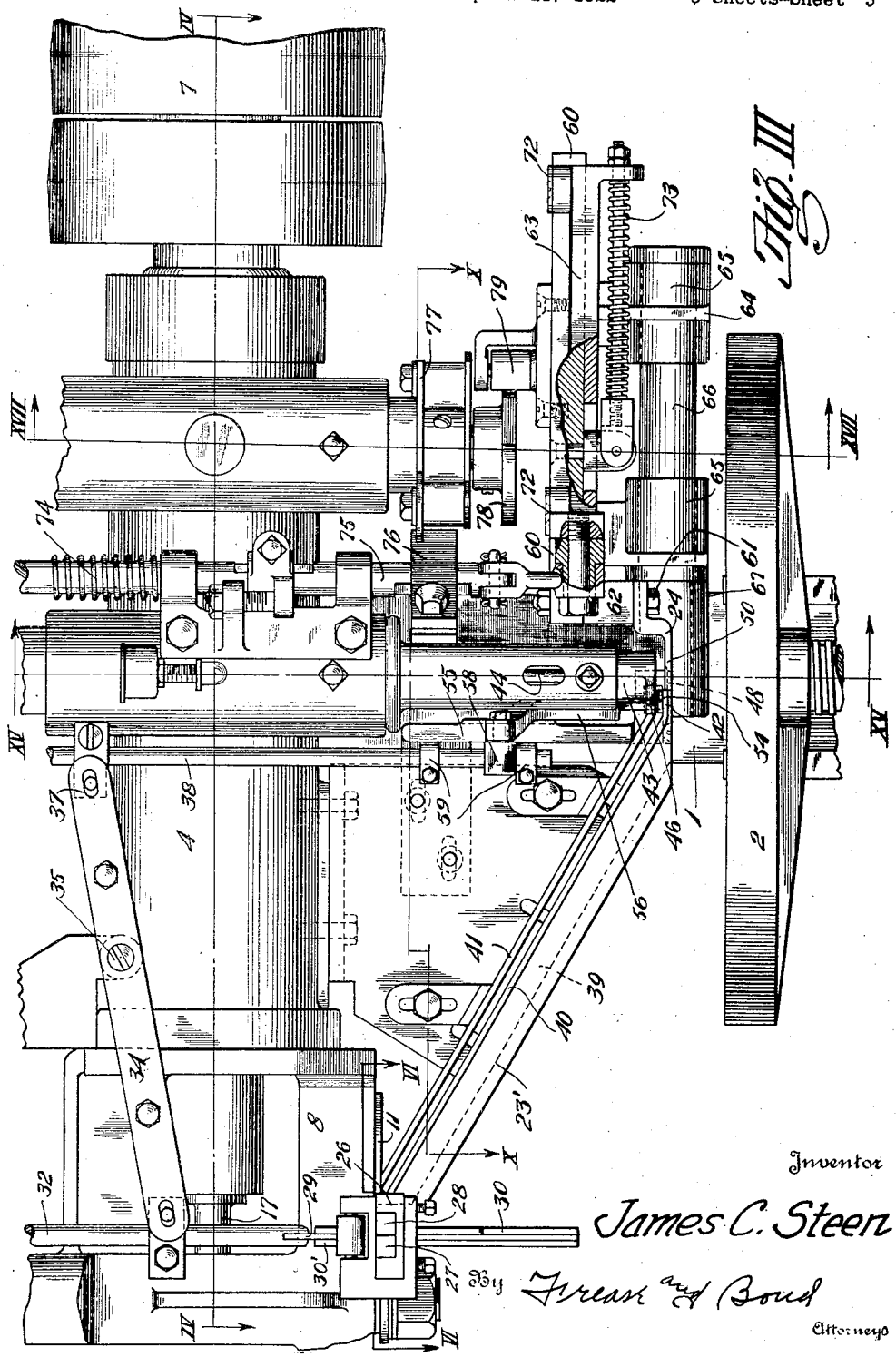

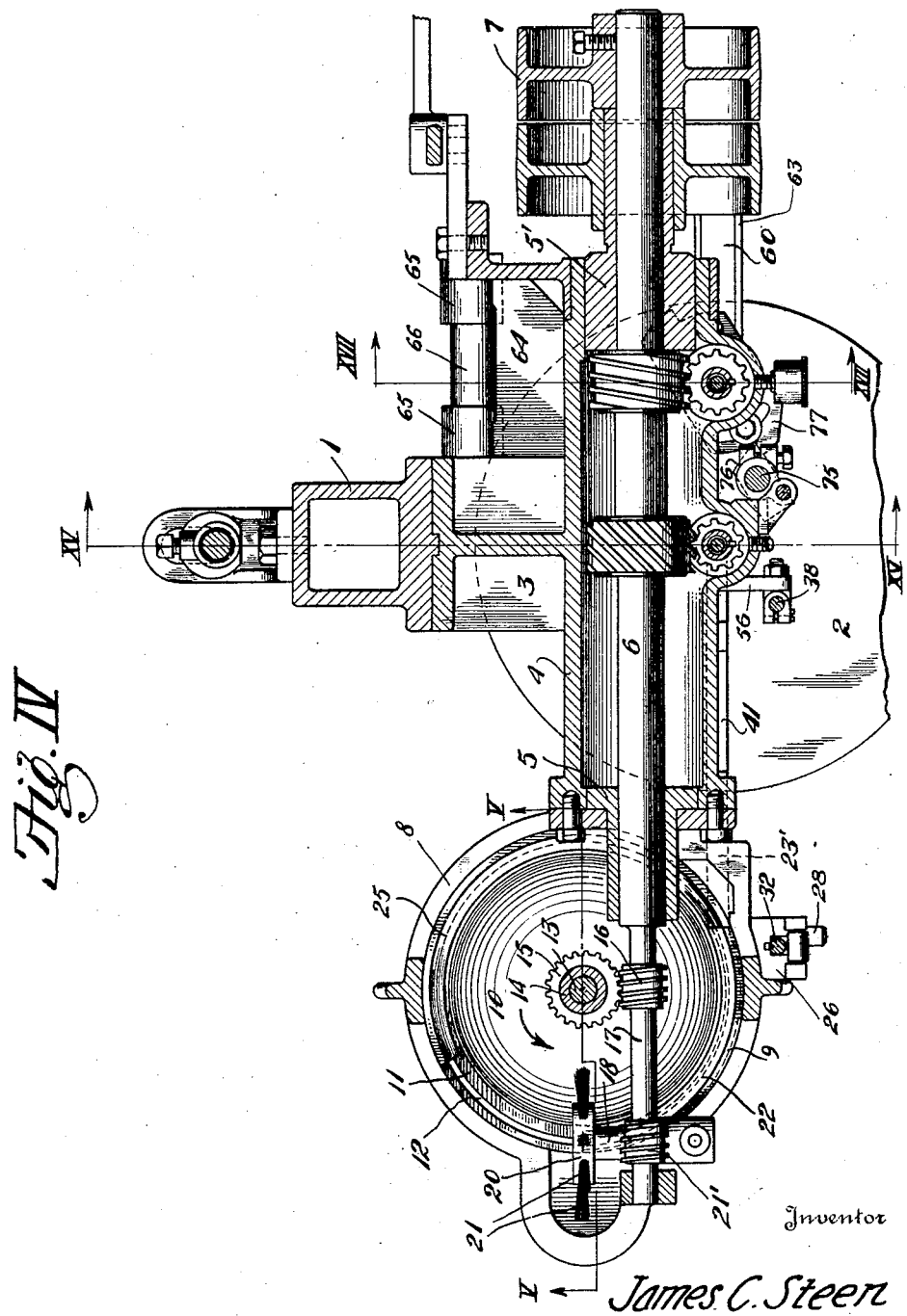

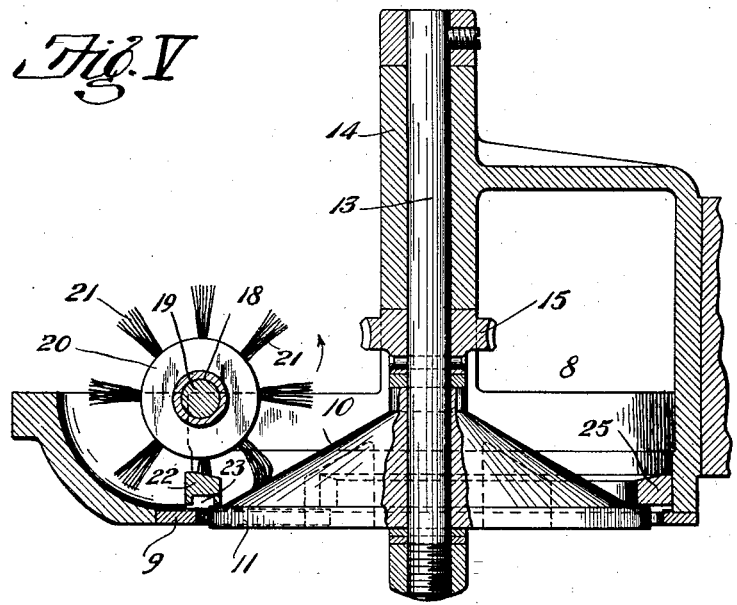
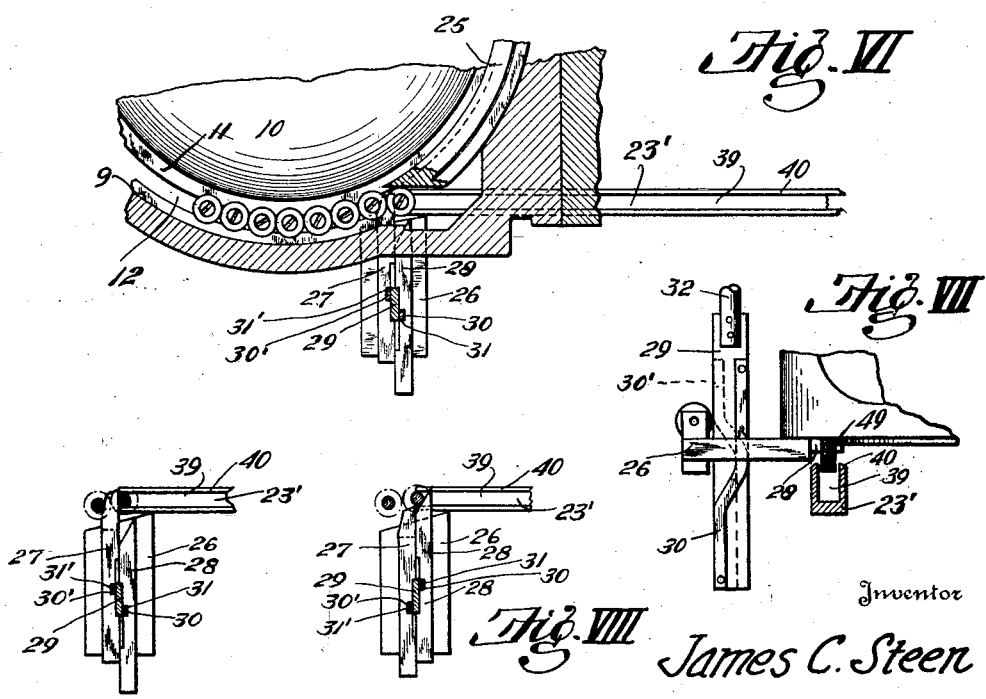

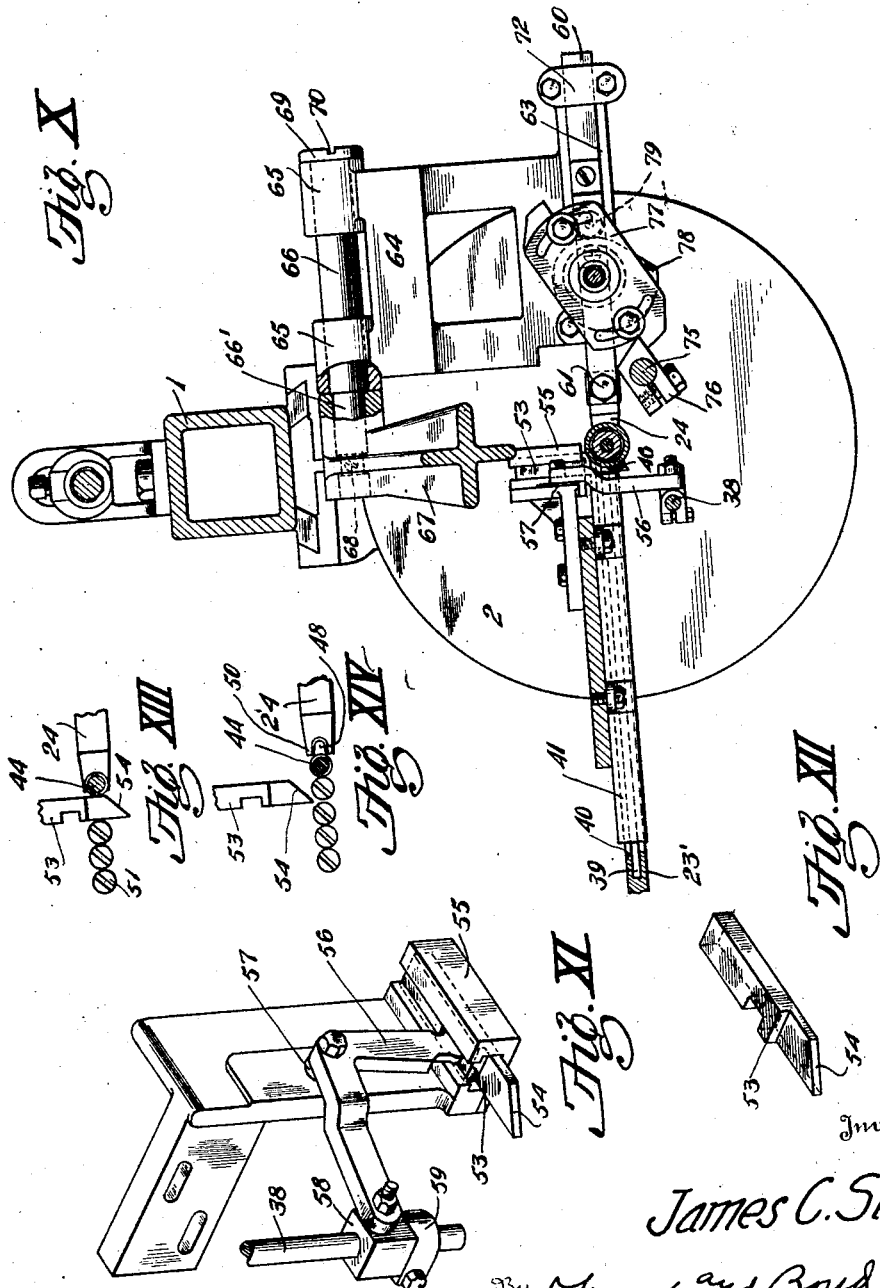

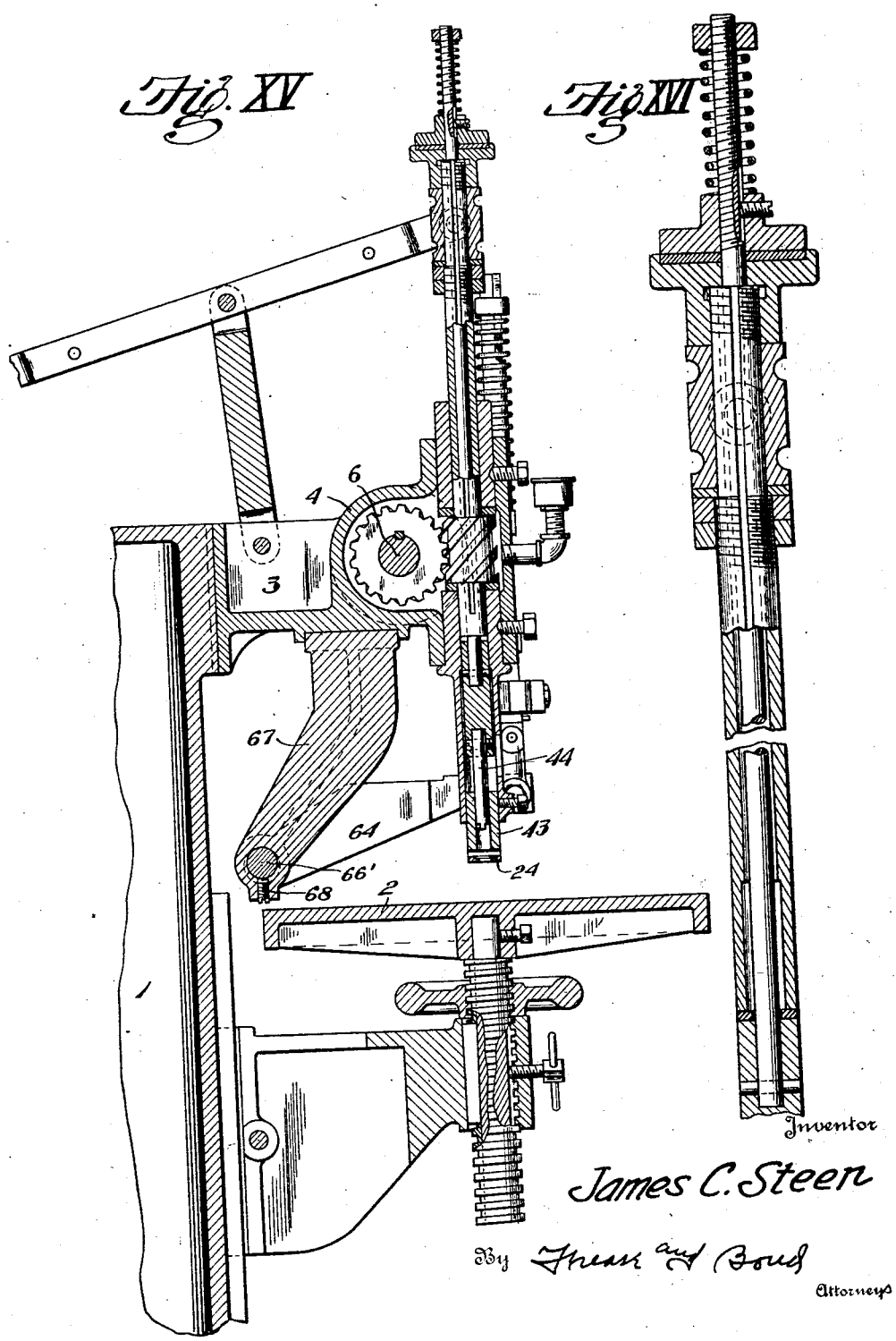

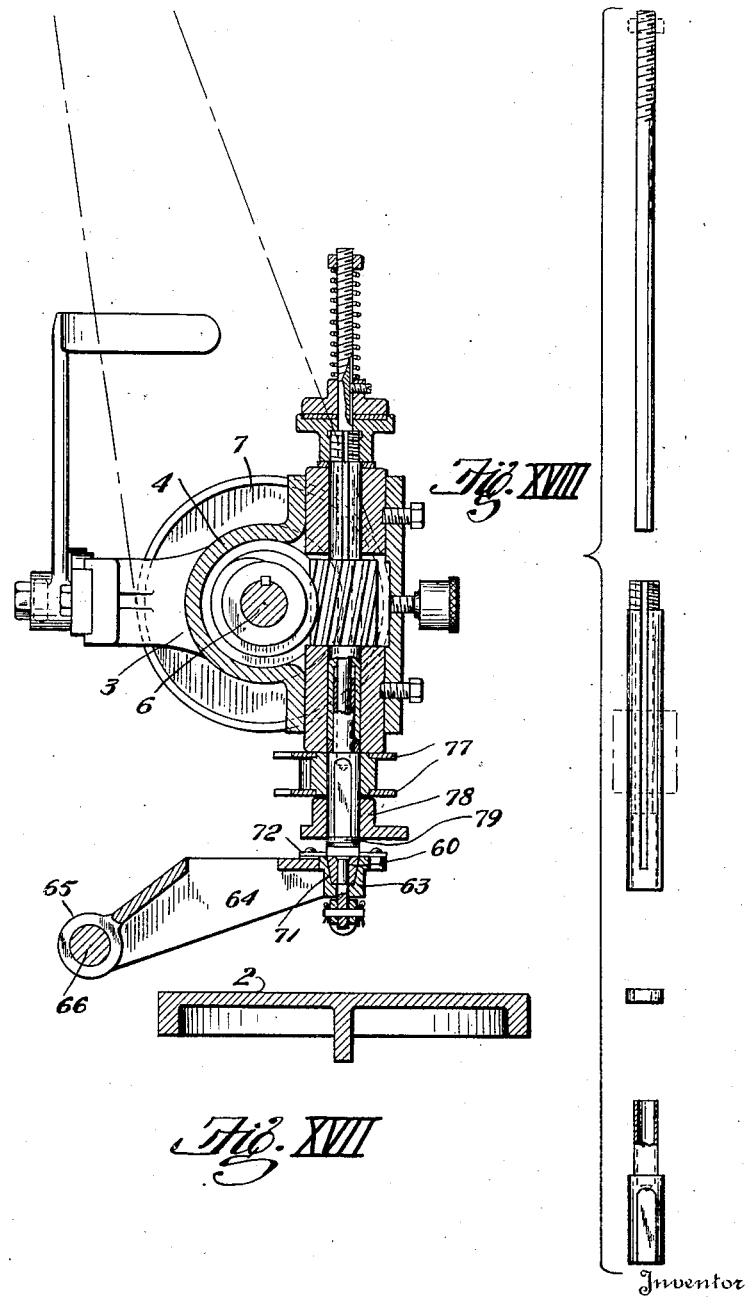

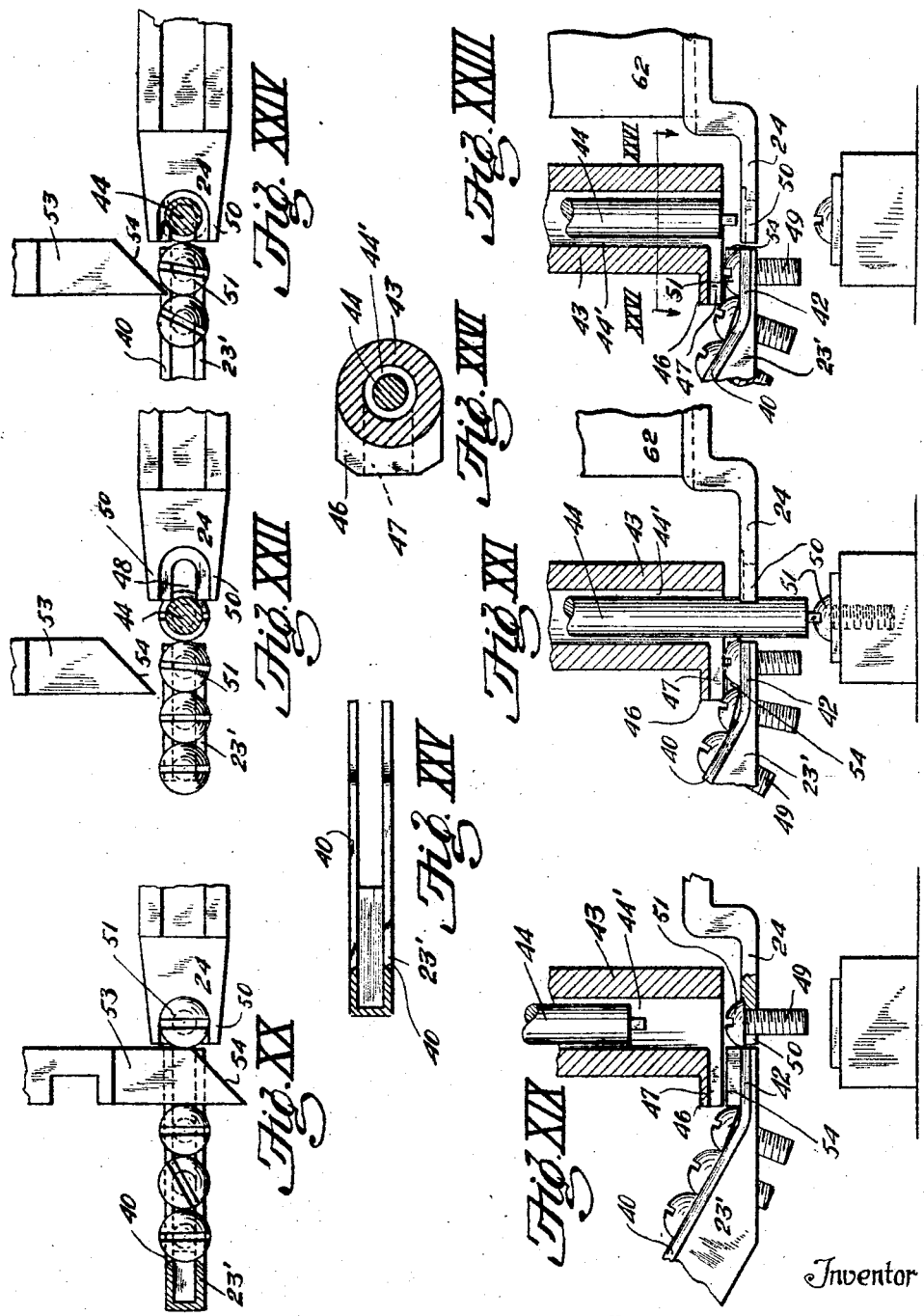

Patented Apr. 12, 1927.

1,624,189

UNITED STATES PATENT OFFICE.

JAMES C. STEEN, OF MASSILLON, OHIO, ASSIGNOR TO THE REYNOLDS MACHINE COMPANY, OF MASSILLON, OHIO, A CORPORATION OF OHIO.

SCREW-DRIVING MACHINE.

Application filed April 18, 1922. Serial No. 555,134.

The invention relates to machines for driving screws, bolts and the like and especially for driving screws and bolts having short shanks with relatively large heads which are difficult to feed and control for the driving operation.

An ordinary form of feed magazine includes a rotatable conical bottom for segregating screws with their stems depending in a circumferential slot around the periphery of the bottom, for passing their heads under a guard ring; and the present improvement involves the use of a rotary brush acting transversely upon the screws at the front end of the guard ring, so as to facilitate the entrance and proper arrangement of the screws in the circumferential slot.

Short screws with large heads, and particularly screws with flat heads and washer heads, are difficult to feed from a feed magazine to a driving mechanism through an inclined chute, for the reason that one flat head or thin washer has a tendency to pass above or below another adjacent head or washer, thereby bunching the screws and preventing a proper feeding of the same; and the present improvement involves the use of either or both an escapement mechanism at the receiving end of the chute and a stop mechanism at the delivery end thereof for separating and feeding individual screws to the driving mechanism.

The driving mechanism includes the use of a supporting or controlling foot mounted for vertical oscillation on a hinged frame and for horizontal oscillation in a slide way; and the present improvement involves eccentric means for adjusting the hinged frame, and tapered means for taking up wear in the slideway.

A screw driving machine embodying the several improvements is illustrated in the accompanying drawings, forming part hereof, in which—

Figure I is a perspective front elevation of the machine, omitting the base and a portion of the pedestal;

Fig. II, a right side elevation of the machine;

Fig. III, a fragmentary front elevation of the driving mechanism;

Fig. IV, a plan section on line IV—IV, Figs. I, II and III, showing the driving gears and the feed magazine;

Fig. V, an elevation section of the feed magazine, on line V—V, on Fig. IV;

Fig. VI, a fragmentary plan section of the escapement, on line VI—VI, Fig. III;

Fig. VII, a fragmentary right side elevation of the escapement mechanism;

Fig. VIII, a fragmentary plan of the escapement fingers, ready for operation;

Fig. IX, a fragmentary plan of the escapement fingers, during operation;

Fig. X, a plan section of the machine, on line X—X, Figs. I, II and III;

Fig. XI, a fragmentary perspective view of the stop mechanism;

Fig. XII, a detached perspective view of the stop finger;

Fig. XIII, a fragmentary plan of the stop finger, in operation;

Fig. XIV, a similar view of the stop finger, withdrawn from operation;

Fig. XV, an axial section of the driving mechanism, on line XV—XV, Figs. I, III and IV;

Fig. XVI, an enlarged axial section of the screw driving spindles;

Fig. XVII, an axial section of the foot controlling mechanism, on line XVII—XVII, on Figs. I, III and IV;

Fig. XVIII, a side elevation of the parts of the foot controlling spindle, separated from each other;

Fig. XIX, a fragmentary axial section of the feed, stop, and foot devices, ready for a driving operation;

Fig. XX, a fragmentary plan of the same;

Fig. XXI, a fragmentary axial section of the feed and foot devices, during a driving operation;

Fig. XXII, a fragmentary plan of the same;

Fig. XXIII, a fragmentary section of the feed and foot devices, between a driving and feeding operation;

Fig. XXIV, a fragmentary plan of the same;

Fig. XXV, a fragmentary plan of the lower end of the inclined chute; and

Fig. XXVI, a section of the lower end of the tubular guide for the screw driving stem, on line XXVI—XXVI, Fig. XXIII.

Similar numerals refer to similar parts throughout the drawings.

The machine may include an upright standard 1 with an adjustable work table 2 mounted on one side thereof, and a screw driving head 3 secured to the upper end thereof above the work table.

In the head 3 is provided a tubular bearing 4 having journal bearings 5 and 5′ in its ends for a main driving shaft 6, which may have a driving pulley 7 secured on one end thereof, as shown in Fig. IV.

On the other end of the transverse bearing is provided a round hopper or screw magazine 8 having an annular fixed bottom 9, within which is mounted a rotatable conical bottom 10 having a peripheral flange 11 spaced from the annular bottom 9 to form a circumferential slot 12 for receiving depending stems of screws.

The conical bottom 10 may be secured to the lower end of a vertical spindle 13 journaled in and supported by an upright bearing 14 mounted on the magazine 8; and the spindle is preferably operated by a worm wheel 15 secured thereon and engaged with a worm gear 16 secured to the reduced end 17 of the main driving shaft 6, the rotation of the conical bottom 10 being in the direction of the arrow shown in Fig. IV.

In the outer side of the magazine 8 is provided a journal bearing 18 for a horizontal spindle 19 located above and tangent to the slot 12 in the bottom of the magazine; upon the free end of which spindle is secured a brush wheel 20 having peripheral brushes 21 operating upon the bottom of the magazine across the annular slot 12 therein, the brush wheel being operated by a worm gear 21′ on the reduced end 17 of the main shaft so as to turn in the direction indicated by the arrow, as shown in Fig. V.

A curved guide ring 22 having a guide channel 23 in its lower side is fixed in the magazine above the annular slot 12, and extends from the forward side of the brush wheel 20 around the forward side of the magazine to the upper end of the inclined feed chute 25′ leading from the periphery of the magazine downward to the foot 24 of the screw driving mechanism.

A curved guard ring 25 is fixed in the magazine above the annular slot 12, and extends from the upper end of the feed chute 23′ rearward around the inner side and part way across the rear side of the magazine so as to leave annular slot 12 open a substantial distance in rear of the brush wheel 20, for receiving stems of screws in rear of the guide ring 22.

In the operation of the machine a quantity of screws are placed in the magazine, and the inclination and rotation of the conical bottom carries them toward and around the periphery thereof, where the stems may drop into the exposed portion of the annular slot 12 in rear of the receiving end of the guide ring 22; and the operation of the brushes 21 on the wheel 20 across the slot at the end of the guide ring 22, facilitates the entrance of screw stems into the slot more effectively than is done by a brush wheel operating longitudinally of the slot; whereupon the heads of the screws enter the channel of the guide ring 22 and are carried along the slot into the upper end of the feed chute 23′, in well known manner.

The escapement mechanism may include a slide block 26 secured to and extending forward from the bottom of the magazine, a horizontal stop finger 27 and a horizontal escapement finger 28 each adapted to slide longitudinally in the guide block, a vertical blade 29 with cam tongues 30 and 30′ on its sides operating in grooves 31 and 31′ in the contiguous sides of the fingers. The cam blade may be operated upward and downward by means of a vertical rod extension 32 adapted to slide in a guide bearing 33 mounted on the magazine, and a rock lever 34 pivotally connected at 35 to the machine and having at one end a slotted pivotal connection 37 with a vertical slide rod 38 operatively connected with the screw driving mechanism so as to rise and fall with the screw driving stem.

The normal position of the stop and escapement fingers during screw driving operations of the machine is with the escapement finger moved forward across the receiving end of the feed chute so as to stop the entrance of screws therein, and the stop finger withdrawn from the path of the stems of screws as shown in Fig. VIII; and the parts are so arranged that during the downward stroke of the screw driving mechanism the escapement finger is withdrawn to release the forward screw and permit it to enter the feed chute, and the stop finger is entered in front of the next screw to prevent it from entering the feed chute as shown in Fig. IX. Upon the successive upward stroke of the screw driving mechanism the fingers are reversely moved into normal position, the movement of the escapement finger being timed to intercept the screw which has been stopped by the other finger before it enters the feed chute.

The inclined chute 23′ is provided with a longitudinal groove 39 in its upper side and the edges 40 of the side flanges thus formed are beveled downward and outward so as to decrease the frictional contact of the heads of the screws sliding down the chute with their shanks depending in the grooves; and a shield plate 41 is mounted above the chute so as to hold the heads of the screws substantially parallel with the inclination of the chute and also to prevent the screws from jumping out of the chute.

The lower end of the feed chute 23′ is horizontally beveled on its lower side, and the remaining portion of the side flanges form guide fingers 42 and extend horizontally part way under the lower end of the tubular guide 43 of the screw driver stem 44, and terminates in line with the side of the tubular guide bore 44' in the normal plane of the foot 24 of the screw driving mechanism, as shown in Fig. XIX.

The lower end of the tubular guide 43 is provided with a flange 46 extending over the horizontal guide fingers at the lower end of the chute, which flange is provided with a channel 47 for receiving and guiding the heads of screws as they are fed to the foot of the driving machine.

The end of the foot 24 of the screw driving mechanism is bifurcated to form a notch 48 to receive the shank 49 of a screw and two fingers 50 for supporting the head 51 of a screw when its shank enters the notch; and the U-shaped edge of the notch 52 is preferably rabbeted for receiving the head of the screw, as shown in Fig. XXII.

A cut-off blade 53 is transversely mounted for operating endwise over and across the chute fingers 42 under the flange 46 of the tubular guide 43, for positively feeding one screw into the foot and stopping the remaining screws which may be in the chute during a screw driving operation.

The end 54 of the blade 53 is beveled from its outer edge to its inner edge, and its inner edge is alined with the ends of the chute fingers 42 so as to permit the screw driving stem 44 to freely pass downward during a downward operation.

The cut-off blade 53 is slidably mounted in a guide bracket 55 secured to the head of the screw driving mechanism, and is operated by a bell crank 56 pivoted to the bracket with an intervening friction washer 57, one arm of which bell crank has a sliding pivotal connection with the blade and the other arm of which is pivotally connected with a block 58 which may be slidably mounted on the lower end of the same vertical slide rod 38 which operates the escapement mechanism.

Spaced collars 59 are secured to the vertical rod 38, one above and below the block 58 thereon, and the parts are so arranged that between screw driving operations of the machine, the lower collar 59 will impinge the block 58 so as to hold the bell crank cut-off blade 53 moved forward into its normal position shown in Figs. XIX and XX, in which position the blade is located between the head of one screw which has been fed into the foot and such other screws as may be in the lower end of the chute.

The upper collar 59 is spaced above the block 58 so that it will not impinge it during the downward stroke of a screw driving operation until the screw driving stem 44 has moved downward past the cut-off blade 53; whereupon a further downward movement of the upper collar 59 swings the bell crank to slide the cut-off blade rearward out of the path of the screws in the chute, thus permitting the screws to slide downward in the path of the chute against the side of the screw driving stem 44, as shown in Figs. XXI and XXII.

Likewise, after a screw has been driven, the lower collar 59 impinges the block 58 to operate the bell crank and slide the cut-off blade forward, so that its point will enter between the first and second screws in the chute just after the driving stem 44 has been raised to clear the foot, as shown in Figs. XXIII and XXIV; and a further forward movement of the blade feeds the first screw into the foot by the sliding action of the beveled end of the blade, which brings the parts in position for driving another screw as shown in Figs. XIX and XX.

The foot 24 is secured to the inner end of a transverse slide bar 60, by means of a bolt 61 with an intervening spacer block 62; and the bar is slidably mounted in a transversely positioned guide bearing 63 formed or secured on the forward end of a swinging bracket 64 having bearings 65 on its rear end journaled on a bearing bar 66 carried by a bearing bracket 67 depending from the head 3 of the screw driving mechanism.

The inner end portion 66' of the bearing bar is preferably reduced in diameter and is formed upon an axis eccentric to that of the other end of the bearing bar upon which the swinging bracket is journaled; and the inner end of the bar is secured against rotation in the bearing bracket 67 by means of a set screw 68. The outer end of the bearing bar is provided with a head 69 which may be provided with a slot 70; and by a loosening of the set screw and a turning of the bearing bar, the swinging bracket may be adjusted forward and rearward to bring the foot 24 connected therewith, into exact alignment with the stem, which is necessary for a proper operation of the machine.

The transverse guide bearing 63 is provided with a guide channel 71 bodily receiving the slide bar 60, and is provided at each end with cross plates 72 for retaining the slide bar in its channel.

The sides of the guide channel 71 and of the slide bar 60 are correspondingly tapered downward and inward so as to make a sliding fit, without any wedging and without any lost motion, when the bottom of the bar rests upon the bottom of the channel; and when the sides of the bar become worn by continued operation of the machine the bottom of the bar may be ground sufficiently to compensate for the wear of the sides; it being understood that the slide bar must fit without any lost motion in its guide bearing to hold the foot in exact position for a screw driving operation.

In the operation of the machine, the foot is normally held inward for receiving and supporting a screw to be driven by a compression spring 73 operatively connected between the slide bar 60 and the guide bearing 63; and the same parts are normally held upward by a compression spring 74 acting upon a vertical slide bar 75 pivotally connected with the guide bearing 63 on the forward end of the swinging bracket 64.

During a screw driving operation, the shoe is carried downward with the screw by a swinging of the slide bar with the guide bearing until a stop arm 76 releases a stop plate 77 and permits a cam disk 78 to rotate against a roller 79 to slide the bar 60 outward and withdraw the shoe laterally from under the screw head; after which the spring 74 draws the shoe upward to clear the screw, the spring 73 acts to return the shoe into normal position for receiving another screw, previous to which the end of the shoe may bear against the side of the driving stem as it moves upward.

I claim:

A screw driving machine including a bifurcated step for receiving and holding a single screw for a driving operation, supporting means for the screw including a swinging bracket, a bearing bar upon one end of which the bracket is journaled, a supporting bracket in which the other end of the bearing bar is secured, the axis of one end of the bar being eccentric to the axis of the other end for adjusting the shoe by a turning of the bar in its support.

JAMES C. STEEN.